United States Patent [19]

White

[11] 4,156,699

[45] May 29, 1979

[54] PHOSPHORUS CONTAINING BLOCK POLYMERS OF POLYPHENYLENE OXIDE

[75] Inventor: Dwain M. White, Schenectady, N.Y.

[73] Assignee: General Electric Company, Schenectady, N.Y.

[21] Appl. No.: 800,641

[22] Filed: May 26, 1977

[51] Int. Cl.$^2$ .................. C08G 65/44; C08G 65/48
[52] U.S. Cl. .................. 260/823; 528/168; 528/169; 528/213
[58] Field of Search .................. 260/823, 47 ET; 528/168, 169, 213

[56] References Cited

U.S. PATENT DOCUMENTS 3,429,850 2/1969 Holoch .................. 260/45.9
3,635,890 1/1972 Takemura et al. .................. 260/47 ET Primary Examiner—Lester L. Lee
Attorney, Agent, or Firm—F. Wesley Turner; Joseph T. Cohen; Charles T. Watts

[57] ABSTRACT

Phosphorus containing linear, branched and/or crosslinked block polymers of polyphenylene oxides are described which comprise di- and/or tri-functional phosphoryl radicals coupled with mono- and/or polyphenoxy radicals, said polyphenoxy radicals being derived from (a) polyphenylene oxides having an average hydroxyl group per molecule value greater than zero including 1.0 or less, or (b) polyphenylene oxide-quinone coupled polymers having an average hydroxyl group per molecule value greater than zero including 2.0 or less, and mixtures thereof. The resulting polyphenylene oxides can be used to prepare flame-retardant polyphenylene oxide articles of manufacture.

14 Claims, No Drawings

PHOSPHORUS CONTAINING BLOCK POLYMERS OF POLYPHENYLENE OXIDE

CROSS REFERENCE TO RELATED APPLICATIONS

This invention is related to subject matter disclosed in my copending U.S. application Ser. Nos. 800,635, 800,656, and 800,644, all filed on May 26, 1977. All of the aforesaid applications are also my inventions and are assigned to the same assignee as the assignee of this application. All of the disclosures referenced above are incorporated herein their entirety by reference.

BACKGROUND OF THE INVENTION

1. Field of the Invention

This invention relates to phosphorus containing linear, branched, and/or cross-linkeed block polymers of polyphenylene oxides which comprise di- and tri-functional phosphoryl radicals coupled with mono- and/or poly-phenoxy radicals, said polyphenoxy radicals being derived from (a) polyphenylene oxides having an average hydroxyl group per molecule value greater than zero including 1.0 or less, and/or (b) quinone coupled polyphenylene oxide polymers having an average hydroxyl group per polymer molecule value greater than zero including 2.0 or less, and mixtures thereof.

In my copending U.S. application Ser. No. 800,635 new polyphenylene oxide-quinone coupled polymers having an average hydroxyl group per molecule value greater than zero including 2.0 or less are described. These new polymers either alone or in combination with polyphenylene oxides reaction products of the prior art, i.e., polyphenylene oxides having an average hydroxyl group per molecule value greater than zero including 1.0 or less, or combinations thereof can be coupled with phosphoryl halides to form new linear, branched, and/or cross-linked polyphenylene oxide block polymers. The polymers prepared as described herein having hydroxyl groups associated with any phenoxy group of the phosphorus containing block polymers can be coupled and/or capped as described in my related U.S. application Ser. No. 800,656, 800,644, filed on May 261,977, to further enhance their molecular weight and/or color stability, respectively.

2. Description of the Prior Art

Self-condensation reactions of certain phenols employing oxygen in combination with an effective oxidative coupling catalyst system to form prior art polyphenylene oxides, i.e., polyphenylene oxides having an average hydroxyl group per molecule of 1.0 or less, are described in various U.S. patent applications including Hay's U.S. Pat. Nos. 3,306,879, 3,914,266, application Ser. No. 540,473, filed Jan. 13, 1975, now U.S. Pat. No. 4,028,341 a continuation-in-part of Ser. No. 441,295, filed February 11, 1974, now abandoned, and Olander's U.S. Pat. Nos. 3,956,442; 3,965,069; 3,972,851 and Ser. No. 582,910, filed June 2, 1975, now U.S. Pat. No. 4,054,553.

Block polymers of prior art polyphenylene oxides employing simple bifunctional coupling compounds such as diacyl halides, diisocyanates, bis(haloaryl)sulfones are described in my U.S. Pat. Nos. 3,793,564; 3,770,850 and 3,809,729.

DESCRIPTION OF THE INVENTION

This invention embodies new phosphorus containing linear, branched, and/or cross-linked block polymers of polyphenylene oxides which comprise di- and/or tri-functional phosphoryl radicals coupled with mono- and/or polyphenoxy radicals, said polyphenoxy radicals being derived from (a) polyphenylene oxides having an average hydroxyl group per molecule value greater than zero including 1.0 or less, and/or (b) quinone-coupled polyphenylene oxide polymers having an average hydroxyl group per molecule value greater than zero including 2.0 or less, and mixtures thereof.

The phenoxy radicals (sometimes referred to herein as monovalent phenoxy residues, and also sometimes abbreviated by the formula —A) are derived from polyphenylene oxides having an average hydroxyl group per molecule value greater than zero including 1.0 or less. These polyphenylene oxides can be prepared by any of the methods known to those skilled in the art including those referenced hereinbefore. Monovalent phenoxy residues of a presently preferred class are illustrated by the formula:

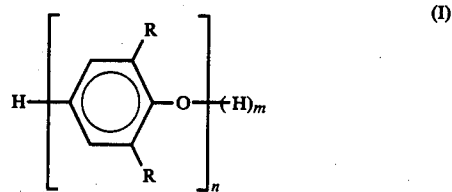

wherein independently each R is hydrogen, a hydrocarbon radical, a halohydrocarbon radical, a hydrocarbonoxy radical or a halohydrocarbonoxy radical, n is a number of at least 10, preferably 40 to 170, and m is zero. Corresponding polyphenylene oxide precursors are illustrated by formula (I) wherein R and n are as defined above, and m is a number greater than zero including 1.0 or less.

The quinone-coupled polyphenoxy radicals (sometimes referred to herein as divalent phenoxy radicals, and also sometimes abbreviated by the formula —B—) are derived from quinone-coupled polyphenylene oxide polymers having an average hydroxyl group per molecule greater than zero including 2.0 or less. These polyphenylene oxides can be prepared by any of the methods described in my previously referred to U.S. application Ser. No. 800,635. Divalent quinone-coupled polyphenoxy radicals of a presently preferred class are illustrated by the formula:

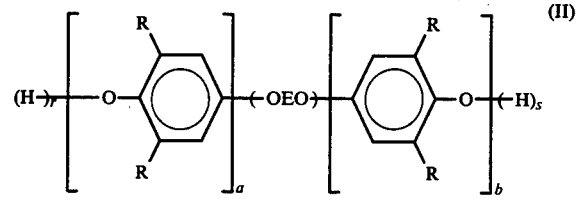

wherein independently each —OE–O— is a divalent quinone residue, E is a divalent arene radical, either a or b is at least equal to 1, the sum of a plus b is preferably at least equal to 10, more preferably 40 to 170, r and s are zero, and R is the same as defined in formula (I) above. Corresponding quinone-coupled polyphenylene oxide precursors are illustrated by formula (II) wherein —OEO—, E, a, b, the sum of a plus b, and R is the same as defined in formula (II) above, r and s are greater than zero including 1 or less, and the sum of r plus s is greater than zero including 2.0 or less.

The phosphoryl radicals (sometimes referred to herein as di- and/or tri-functional phosphoryl residues, and also sometimes abbreviated by the formula —Z— and

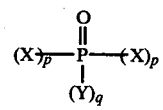

are derived from any phosphoryl halide subject to the proviso that the phosphoryl halide have at least two halide coupling reaction sites. The term "phosphoryl halide" includes mono- or polyphosphoryl halides, ortho- or pyrophosphoryl halides, including inorganic or organic members of the above group. Methods for the preparation of phosphoryl di- and trihalides are well known to those skilled in the art including the oxidation of phosphorus trihalides, the replacement of a halide of a phosphoryl trihalide by an alkyl, cycloalkyl, aryl, etc. group using alcohols and phenols. Phosphoryl radicals of a presently preferred class are illustrated by the formula:

$$(X)_{\overline{p}} - \overset{O}{\underset{(Y)_q}{\overset{\|}{P}}} - (X)_p \quad \text{(III)}$$

wherein Y is selected from alkyl, cycloalkyl, aryl, alkoxy, cycloalkoxy or aryloxy, preferably $C_{1-5}$ alkyl or alkoxy, p is equal to zero, and q is a number equal to zero or 1. Corresponding phosphoryl halide precursors are illustrated by formula (III) above wherein independently each X is a halogen, Y is as previously defined or a halogen, p and q are each 1. Illustratively, other phosphoryl radicals that can be associated with the block polymers of my invention are of the formula:

$$(X)_{\overline{p}} - \overset{O}{\underset{(Y)_q}{\overset{\|}{P}}} - O - \overset{O}{\underset{(Y)_q}{\overset{\|}{P}}} - (X)_p \quad \text{(IV)}$$

wherein X, Y, p and q are as previously defined relative to the phosphoryl radicals of formula (III). Corresponding phosphoryl halide precursors are illustrated by formula IV above wherein independently each X, Y, p and q are as previously defined relative to the phosphoryl halide precursors of formula (IV).

Illustrative of a portion of presently preferred phosphoryl halides that can be employed are the following:
POF$_2$Cl
POFCl$_2$
POF$_2$Br
POFBr$_2$
POCl$_2$Br
POClBr$_2$
POCl$_3$
POBr$_3$
POF$_3$
CH$_3$POCl$_2$
n-C$_4$H$_9$POCl$_2$
cyclo-C$_6$H$_{11}$POCl$_2$
C$_6$H$_5$POCl$_2$
p-CH$_3$-C$_6$H$_5$POCl$_2$
C$_6$H$_5$CH$_2$POCl$_2$
[(C$_6$H$_5$)—$_3$C—POCl$_2$
CH$_3$.O.POCl$_2$
sec-C$_4$H$_9$—O—POCl$_2$
tert—C$_4$H$_9$—O—POCl$_2$
C$_{10}$H$_{21}$—O—POCl$_2$
C$_6$H$_5$—O—POCl$_2$
p—CH$_3$—C$_6$H$_5$—O—POCl$_2$
C$_6$H$_5$CH$_2$O—POCl$_2$

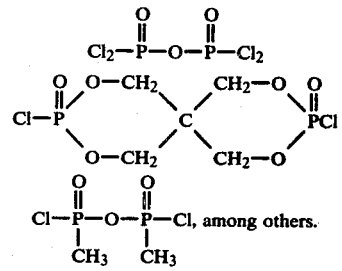

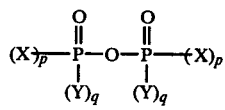 Cl, among others.

Illustrative of the broad group of phosphorus containing block polymers of polyphenylene oxides that are included in the scope of this invention, among others, are those described by the following illustrative linear, branched and crosslinked block polymer structures:

(V linear)   AZA, AZB, BZB, AZBZA, AZBZB, BZBZB, etc.
             B   B A   A A
(V branched) AZA, AZBZA, AZBZA, etc.
                                     A
                     A            Z
(V cross-linked   AZBZBZA,    AZBZBZ,   etc.
                  B   B       B
                 AZBZBZBZA    AZBZBZA
                                  A The above illustrative linear branched cross-linked combinations of monovalent phenoxy radicals, divalent phenoxy radicals, and di- and/or tri-functional phosphoryl radicals are not intended to limit the combinations that can be obtained by the practice of this invention since such combinations are limited only by the stoichiometric amounts of the representative precursors of the various radicals charged to the reaction medium in carrying out the process of this invention. Preferred phosphorus containing block copolymers of the polyphenylene oxide are linear polymers wherein the phosphoryl radicals of the polymer backbone are difunctional phosphoryl residues. Even more preferred are linear polymers containing substantial amounts of phosphoryl radicals, i.e. amounts sufficient to provide phosphorus content of the polymers of from at least 1% to as much as 10% by weight phosphors, and such phosphorus containing block polymers of polyphenylene oxide have enhanced fire retardancy and exhibit to the enhanced flame retardancy when combined with other polymeric material such as high impact polystyrene resins in accordance with the Cizek U.S. Pat. No. 3,383,435 teachings. Advantageously, Noryl ® resins containing phosphorus block segments in combination with polyphenylene oxide block segments not only have improved or enhanced flame retardancy but also exhibit enhanced flame retardance without substantial decrease in the T$_g$ associated with other Noryl ® resins wherein the phosphorus containing flame retardant additive is not an integral part of the polymer block of a polyphenylene oxide contained within the blends of polyphenylene oxide and high impact polystyrene resins.

In a preferred embodiment, the reaction is carried out in the presence of water soluble base as well as in the presence of a catalytic phase transfer agent. The water soluble base can be any water soluble base which, in the presence of the phenoxy mono- or polyvalent or divalent phenoxy radicals will convert substantially all of the hydroxy groups associated therewith to phenoxides, i.e. alkali metal or alkaline earth metal cation phenoxides or "onium" phenoxides derived from the phase transfer catalyst. Further illustration of the bases that can be employed are alkali metal or alkaline earth metal hydroxides and carbonates, e.g. potassium hydroxide, sodium hydroxide, sodium monocarbonate, barium carbonate, etc. In general, the amount of water soluble base employed can be any amount, e.g. an amount of from about 0.1 to about 1000, preferably from about 1 to about 20 and more preferably from 1.5 to about 5 moles of base per hydroxyl group associated with the polymers as identified by hydroxyl group infrared absorption at 3610 cm.$^{31}$ $^{1}$ based on a 2.5% solution in a $CS_2$ over a 1 cm. path calibrated against $CS_2$ in a matched cell.

Catalytic phase transfer agents that are employed can be employed in any amount and are any agent selected from the group consisting of quaternary ammonium compounds, quaternary phosphonium and tertiary sulfonium compounds, etc. or mixtures thereof. These phase transfer agents are well-known to those skilled in the art. The catalytic phase transfer agents can also be employed in any amount, e.g. in amounts of from about 0.001 to about 10 preferably from about 0.01 to about 1.0 and more preferably from about 0.05 to about 0.5 moles, based on the molar amounts of hydroxyl groups associated with the polymer.

EXAMPLE I

(A) Polymer Preparation

A 2.5 gallon stainless steel reactor equipped with an air-driven paddle stirrer, oxygen inlet tube, and water-cooled coil and jacket was charged with 4.9 l. toluene, 151.5 ml. of a catalyst stock solution (29.5 ml. bromine added slowly to a chilled solution of 7.76 g. cuprous oxide and 132.0 g. 2,6-xylenol (also known as 2,6-dimethylphenol) in methanol, diluted with toluene to 1.0 l.), 5.64 g. N,N'-di-t-butylethylenediamine (DBEDA), 33.2 g. N,N-dimethylbutylamine (DMBA), and 20.0 g. di-n-butylamine (DBA). Oxygen was bubbled through the reaction medium at a rate of 10 SCFH and vigorous mixing. 2000 g. 2,6-xylenol in 2.0 l. of toluene was pumped into the reactor over a 30-minute period. Summarily, the reaction parameters relative to molar ratios of 2,6-xylenol:Cu:DBEDA:Br:DBA were as follows: 1000:1:2:20:8:9.4.

(B) Deactivation Catalyst System

The reaction was terminated after 45 minutes (from start of monomer addition) by replacing oxygen with nitrogen and the addition of 20.0 ml. 38% $Na_3EDTA$ in water. Polymer analysis showed: [$\eta$]0.30 dl./g.; 3,3',5,5'-tetramethyl-1,4-diphenoquinione (TMDQ) equal to 0.76% by weight based on the weight of 2,6-xylenol.

(C) Quinone Coupling Reactions (1) The TMDQ containing reaction mixture washed with an equal volume of warm water (ca. 50° C.) and passed through a Westphalia liquid-liquid centrifuge to remove the aqueous phase which contained copper salts and a portion of the amine. Methanol (2.5 volumes) was added slowly with stirring to half of the centrifuged reaction mixture to precipitate the polymer. A portion of the quinone reacted polymer was collected on a filter, washed with metahnol and dried in a circulating air oven at 80° C. Polymer analysis showed an intrinsic viscosity [$\eta$] equal to 0.25 dl./g.

(2) The remaining half of the water washed quinone reacted polymer (approximately 1000 g.) was heated under nitrogen at 95° C. for 15 minutes. The yellow color characteristically associated with free quinone (quinone unreacted with polymer) associated with the quinone reacted polymer decreased to a very low color intensity. Polymer analysis showed an intrinsic viscosity [$\eta$] equal to 0.26 dl./g.

(D) Phosphorus Coupling Quinone-Coupled Polymer

Half of the polymer solution was cooled to 60° C. in the 2.5 gallon reactor, 5.0 g. Aliquat ®336 and 73.2 g. 50% aqueous NaOH were charged into the reactor and the mixture was stirred vigorously (under $N_2$) for 2 minutes. 11.2 ml. $POCl_3$ (in 150 ml. toluene) was then added over a 15 minute period (60° C. temperature and vigorous stirring maintained), being delivered through the oxygen inlet tube to a point just above the tip of the stirrer blade. The viscous light tan solution was neutralized with acetic acid. The coupling reaction was repeated on the remaining polymer solution. Both solutions were combined to sure uniformity.

(E) Isolation of Phosphorus Coupled Quinone Coupled Polymer (1) One half of the resulting phosphorus containing polymer was isolated in pelletized form by steam precipitation of half of the combined coupled polymer solution of (D). In this step the solution was sprayed through an orifice with steam into a tank of stirred hot water at such a rate as to remove volatiles azeotropically and allow the solids to coalesce into granules. The polymer was dried at 95°–1000° C. Polymer analysis showed an intrinsic viscosity [$\eta$] equal to 0.64 dl./g.

(2) The remaining half of the phosphorus containing coupled polymer solution was isolated by dilution with toluene to 15% solids followed by precipitation by the gradual addition of a three-fold excess of methanol. The polymer was collected on a Buchner funnel, washed with methanol and dried. Polymer analysis showed an intrinsic viscosity equal to 0.62 dl./g. Both polymers were blended with polystyrene.

(F) Phosphorus Containing Polymers Blended with Polystyrene

The polymers isolated in (E) (1) and (2) above were blended with high impact polystyrene accordingly: 50 parts of poly(phenylene oxide), 50 parts of high impact polystyrene, plus minor amounts, e.g. less than 10 parts, of stabilizing additives. The blends were compounded on a Werner and Pfleiderer K-28 twin screw extruder at a temperature range from 260 to 293° C. and at rate of 15 pounds per hour. Extruded samples were air dried 2 hours at 125° C. and molded on a Battenfield Injection Molding machine (2.8 oz. shot size) having a 510° F. barrel temperature, a 180° F. mold surface temperature, an 8 sec. injection time, and an 8000 psi injection pressure.

The impact strengths on prenotched bars of the polymer blends are listed hereafter:

| Isolation Procedure | Notched Izod Impact (ASTM D256) |
|---|---|
| Steam precipitated | 4.2 ft.lbs./in. notch |
| Methanol precipitated | 4.3 ft.lbs./in. notch |

Tensile tests showed the samples to be ductile and equivalent to commercial material in tensile strength.

EXAMPLE II

A series of phosphorus containing polyphenylene oxides were prepared employing various polymerization reactions, quinone and phosphorus coupling reactions, as well as polymer isolation techniques. The temperatures, intrinsic viscosities and hydroxyl contents associated with the reactions and isolation procedures are summarized in Tables II(a), (b) and (c) hereafter. The physical properties of the phosphorus coupled polymers when blended with polystyrene were evaluated for impact, heat distortion and nitrogen content and the associated properties are summarized in Table II(d), also set out hereafter.

TABLE II(a)

| | | Polymer Processing Stages | | | |
|---|---|---|---|---|---|
| Run No. | Polymer Preparation Catalyst (a) System | Quinone Coupling Temp.Range °C. | Phosphorus Coupling Temp.Range °C. | Isolation Techniques Methanol | Steam Ppt. |
| 1 | Copper /Diamine | 50°– 85°±5° | 60° | x | |
| 2 | ↓ | ↓ 95 | 60 | x | |
| 3 | ↓ | ↓ 95 | 60 | x | |
| 4 | ↓ | ↓ 95 | 60 | x | |
| 5 | ↓ | ↓ 95 | 60 | | x |
| 6 | ↓ | ↓ 95 | 60 | x | |
| 7 | ↓ | ↓ 95 | 60 | x | |
| 8 | ↓ | ↓ 95 | 60 | | x |
| 9 | ↓ (b) | ↓ 95(b) | 60 | x | |
| 10 | ↓ (b) | ↓ 95(b) | 60 | x | |
| 11 | ↓ (b) | ↓ 95(b) | 60 | | x |
| 12 | ↓ | ↓ 95 | 60 | x | |
| 13 | ↓ | ↓ 95 | 60 | | x |
| 14 | ↓ | ↓ 95 | 60 | x | |
| 15 | ↓ | ↓ 60 | 60 | x | |
| 16 | ↓ | 50 | 50 | x | |
| 17 | Copper /Diamine /No. MeOH | 50 | | x | |
| 18 | ↓ (c) | 60 | 60 | x | |
| 19 | ↓ (c) | 60 | 60 | x | |
| 20 | Mn /oxime | 60 | 60 | x | |
| 21 | ↓ | 95 | 60 | x | |

(a) Catalyst compositions contained 1% DBA and 6% methanol(MeOH) based on the weight of 2,6-xylenol. Molar ratios 2,6-xylenol:Cu:DBEDA:DMBA were as follows: 1000:1:2:20.
(b) 0.5% DBA added during polymer preparation, and 0.5% DBA added during quinone coupling.
(c) Aliquat ® 336 present during polymerization.
(d) Mn(II) benzoinoxime chelate catalyst (U.S. 3,956,242).

TABLE II(b)

| | Intrinsic Viscosity [η] at Associated Polymer Processing Stages | | | |
|---|---|---|---|---|
| Run No. | Initial Polymer[1] | Quinone Coupled[1] | Phosphorus Coupled[1] | Phosphorus Coupled[2] |
| 1 | .32 | .27 | .61 | .64 |
| 2 | .36 | .34 | .64 | .68 |
| 3 | .36 | .34 | .65 | .74 |
| 4 | .30 | .26 | .62 | .61 |
| 5 | .30 | .26 | .64 | .61 |
| 6 | .30 | .26 | .62 | .62 |
| 7 | .31 | .27 | .63 | .63 |
| 8 | .31 | .27 | .68 | .61 |
| 9 | .29 | .26 | .64 | .62 |
| 10 | .29 | .27 | .65 | .61 |
| 11 | .29 | .27 | .63 | .60 |
| 12 | .31 | .27 | .69 | .67 |
| 13 | .31 | .27 | .66 | .64 |
| 14 | .30 | .27 | .61 | .61 |
| 15 | .30 | .26 | .58 | .58 |
| 16 | .28 | .25 | .55 | .57 |
| 17 | .28 | .25 | .57 | .54 |
| 18 | .31 | .26 | .53 | .55 |
| 19 | .33 | .29 | .50 | .51 |
| 20 | .33 | .29 | .55 | .56 |
| 21 | .34 | .27 | .56 | .60 |

[1] I.V. of polymer powder measured in chloroform at 25° C.
[2] I.V. of polymer film compression molded (2 minutes at 270° C. having film thickness of 5-10 mils) measured in chloroform at 25° C.

TABLE II(c)

| | Isolated Polymer [OH] Absorption at 3610 cm.$^{-1}$ At Associated Polymer Processing Stages | | |
|---|---|---|---|
| Run No. | Initial Polymer | Quinone Coupled | Phosphorus Coupled |
| 1 | .135 | .263 | .002 |
| 2 | .113 | .204 | .000 |
| 3 | .113 | .183 | .000 |
| 4 | .161 | .249 | .002 |
| 5 | .161 | .249 | .006 |
| 6 | .161 | .249 | .002 |
| 7 | .119 | .220 | .005 |
| 8 | .119 | .220 | .005 |
| 9 | .174 | .262 | .003 |
| 10 | .166 | .256 | .000 |
| 11 | .166 | .256 | .005 |
| 12 | .132 | .231 | .004 |
| 13 | .132 | .231 | .004 |
| 14 | .191 | .254 | .002 |
| 15 | .175 | .270 | .075 |
| 16 | .196 | .265 | .007 |
| 17 | .196 | .265 | .004 |
| 18 | .161 | .257 | .002 |
| 19 | .118 | .220 | .012 |
| 20 | .118 | .220 | .006 |

TABLE II(c)-continued

| Run No. | Isolated Polymer [OH] Absorption at 3610 cm.$^{-1}$ At Associated Polymer Processing Stages | | |
|---|---|---|---|
| | Initial Polymer | Quinone Coupled | Phosphorus Coupled |
| 21 | .247 | .328 | .035 |

TABLE II(d)

Physical Properties of Polyphenylene Oxide Polystyrene Blends After Phosphorus Coupling and Polymer Isolation

| Run No. | Impact | | HDT °C.[4] | N ppm.[6] |
|---|---|---|---|---|
| | Izod[2] | Gardner[3] | | |
| 1 | 4.8(5.3) | 140 | 110 | 1100 |
| 2 | 4.1 ↓ | 132 | 112 | 920 |
| 3 | 4.4 ↓ | 148 | 112 | 977 |
| 4 | 4.3 ↓ | 160 | 113 | 859 |
| 4 | 4.2 ↓ | 160 | 113 | 1035 |
| 6 | 4.5 ↓ | 200 | 110 | 865 |
| 7 | 4.4 ↓ | 164 | 106 | 952 |
| 8 | 3.7 ↓ | 140 | 110 | 1298 |
| 9 | 4.9(5.7) | 168 | 110 | 979 |
| 10 | 5.2 ↓ | 164 | 107 | 949 |
| 11 | 4.5 ↓ | 156 | 111 | 1083 |
| 12 | 5.5 ↓ | 220 | 111 | 886 |
| 13 | 4.8 ↓ | 172 | 111 | 1178 |
| 14 | 5.1 ↓ | 200 | 106 | 801 |
| 15 | 5.8 ↓ | 172 | 109 | 981 |
| 16 | 4.7 ↓ | n.d. | 106 | 1040 |
| 17 | 4.4 ↓ | ↓ | 106 | 1247 |
| 18 | 4.7 ↓ | ↓ | 107 | 1192 |
| 19 | 4.6 ↓ | ↓ | n.d. | 1094 |
| 20 | 5.2 ↓ | ↓ | ↓ | 1080 |
| 21 | 4.1(5.5) | ↓ | ↓ | 913 |

- Izod Impact Strength, ASTM Test D256, method A measured in ft-lbs/in of notch
- number in parenthesis is impact value for commercial Noryl resin.
- Gardner Impact Strength, ct ASTM D2794-69
- HDT, ASMT test D, heat distortion temperature in °C.
- N/ppm., Analysis for chemical bound nitrogen by Kjeldahl method.

EXAMPLE III

(A) Polymer Preparation 24.4 g. of 2,6-xylenol was added to a stirred solution of 94 ml. of toluene, 0.228 g. N,N-dimethylbutylamine, i.e. DMBA, 0.099 g. of equal molar quantities of cupric bromide and DBEDA, i.e. $CuBr_2.(t-C_4H_9-NHCH_2CH_2-NH-t-C_4H_9)$, 0.10 g. of 4-bromo-2,6-xylenol, in a stirred 25° C. constant temperature bath while oxygen was bubbled in at 0.5 SCFH. After 55 minutes a small sample was removed, precipitated with methanol, washed and dried. Polymer analysis showed an intrinsic viscosity [η] equal to 0.24 dl./g.

(B) Catalyst Deactivation, and (C) Quinone Coupling

The remaining mixture was stirred under nitrogen, 1.13 ml. of 10% Aliquat ® 336 in toluene and 2.3 g. 50% aqueous sodium hydroxide were added and the mixture was stirred with a Vibromixer for 30 minutes. A small sample of polymer was removed and isolated as above. Polymer analysis showed an intrinsic viscosity [η] equal to 0.29 dl./g.

(D) Phosphorus Coupling

To the remainder of the polymer solution, 0.115 g. $POCl_3$ was added over a 50 minute period and the resulting polymer was isolated as above. Polymer analysis showed an intrinsic viscosity [η] equal to 0.42 dl./g.

EXAMPLE IV

Poly(2,6-dimethyl-1,4-phenylene oxide) having an intrinsic viscosity of 0.33 dl./g. was prepared as in Example III above and isolated by methanol precipitation, washed and dried. 2.44 grams of the polymer was dissolved in 8.2 ml. chlorobenzene, 0.12 ml. of the 10% solution by weight of Aliquat ®336 in toluene plus 90 ml. of a 50% aqueous sodium hydroxide solution were added to the polymer solution while agitating the mixture over a 30 minute period. 0.020 g. of $POCl_3$ was added over a subsequent 10 minute interval and the resulting phosphorus coupled polymer was isolated by methanol precipitation, washed and dried. Polymer analysis showed intrinsic viscosity [η] equal to 0.72 dl./g. Hydroxy [OH]absorbance of the initial polymer as prepared in Example III at 3610 cm.$^{-1}$ was 0.18 units while the hydroxyl absorbance value of the phosphorus coupling was 0.016 units.

EXAMPLE V

Example IV above was repeated with the exception that the phosphoryl halide, $POCl_3$, quantity was diminished, i.e. 0.010 g. of $POCl_3$ was added over a 10 minute period as opposed to 0.020 g. as described in Example IV. The 0.010 g. amount of $POCl_3$ corresponded to the theoretical chemical equivalent amount of $POCl_3$ required to completely couple with the quinone coupled polymer based on the hydroxyl absorbance value of 0.18 units. Polymer analysis — prior to phosphorus coupling — showed an intrinsic viscosity [η] equal to 0.33 dl./g. and an OH absorbance of 0.18 units, and — after phosphorus coupling — showed an intrinsic viscosity [η] equal to 0.70 dl./g. and an OH absorbance of 0.015 units.

As illustrated by the foregoing examples, phosphorus containing block polymers, polyphenylene oxide can be formed having an intrinsic viscosity within the range of from about 0.42 to 1.0 or even higher as measured in chloroform at 25° C. In general, the phosphorus block containing polymers number average molecular weight $M_n$ can be any number average molecular weight and such polymers generally fall within the range of from about 5,000 to about 60,000, preferably from about 15,000 to about 30,000 wherein the intrinsic viscosities of the polymer blocks are within the range of from about 0.17 to 1.7, and 0.4 to 0.7 respectively.

The polymers of this invention can be combined with other fillers, modifying agents, etc., such as dies, pigments, stabilizers and other flame retardant additives with beneficial results.

I claim:

1. A phosphorus containing block polymer of polyphenylene oxide comprising phosphoryl radicals, monovalent phenoxy radicals or divalent phenoxy radicals, and mixtures thereof.

2. A phosphorus containing block polymer of polyphenylene oxide comprising (I) phosphoryl radicals of the formulae:

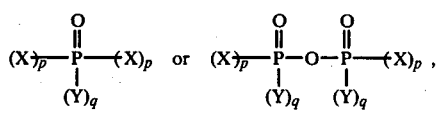

and mixtures thereof wherein Y is selected from alkyl, cycloalkyl, aryl, alkoxy, cycloalkoxy or aryloxy, p is equal to O, and q is a number equal to 0 to 1, (II) monovalent phenoxy radicals of the formula:

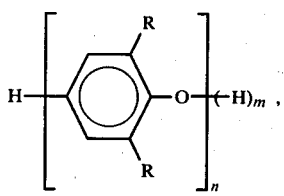

wherein independently each R is hydrogen, a hydrocarbon radical, a halohydrocarbon radical, a hydrocarbonoxy radical or a halohydrocarbonoxy radical, n is a number of at least 10, m is zero, and/or (III) divalent phenoxy radicals of the formula:

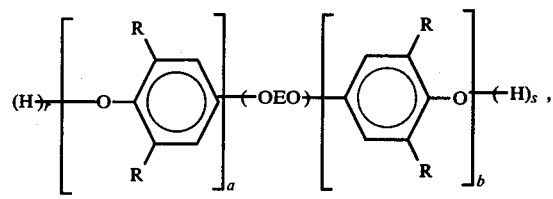

wherein r and s are zero, either a or b is at least equal to 1 the sum of a plus b is at least equal to 10, —(OEO)— is a divalent quinone residue, E is a divalent arene radical.

3. The claim 2 compound, wherein —OEO— is of the formula

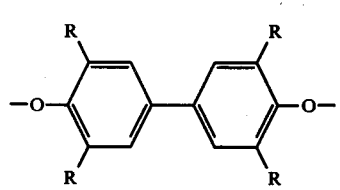

wherein independently each R is as defined hereinbefore.

4. The claim 2 compound, wherein n is a at least 10, and the sum of a plus b is at least 10.

5. The claim 2 or 3 compound, wherein each R is hydrogen, a hydrocarbon, or a halohydrocarbon radical, n is a number of from 40 to 170 and the sum of a plus b is 40 to 170.

6. The claim 5 compound, wherein each R is a methyl radical.

7. A process of forming phosphorus containing block polymers of polyphenylene oxide which comprises contacting (I) phosphoryl halides with (II) polyphenylene oxides having an average hydroxyl group per molecular value greater than zero including 1.0 or less, and/or (III) quinone-coupled polyphenylene oxides having an average hydroxyl group per molecule value greater than zero including 2.0 or less.

8. The claim 7 process, wherein the phosphoryl halides are the formulae:

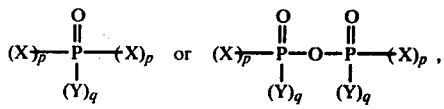

and mixtures thereof wherein Y is selected from alkyl, cycloalkyl, aryl, alkoxy, cycloalkoxy or aryloxy, or a halogen, each X is a halogen, each p and q is the number 1, wherein the polyphenylene oxides are of the formulae:

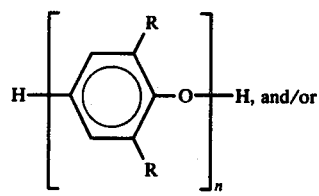

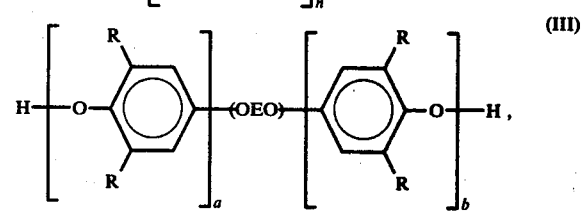

wherein independently each R is hydrogen, a hydrocarbon radical, a halohydrocarbon radical, a hydrocarbonoxy radical or a halohydrocarbonoxy radical, n is a number of at least 10, either a or b is at least equal to 1, the sum of a plus b is at least equal to 10, —(OEO)— is a divalent quinone residue, and E is a divalent arene radical.

9. The claim 8 process, wherein —(OEO)— is of the formula

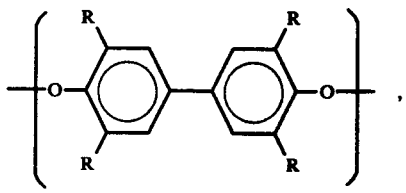

wherein independently each R is as defined hereinbefore.

10. The claim 9 process, wherein n is at least 10, and the sum of a plus b is at least 10.

11. The claim 10 process, wherein each R is hydrogen, a hydrocarbon, or a halohydrocarbon radical, n is a number of from 40 to 170 and the sum of a plus b is 40 to 170.

12. The claim 11 process, wherein each R is a methyl radical.

13. The claim 8 process, carried out in the presence of water soluble base.

14. The claim 13 process, carried out in the presence of a catalytic phase transfer agent.

* * * * *